July 7, 1953 V. A. TAUSCHER ET AL 2,644,727
DOUBLE-BALL GYRO PRECESSION AXIS BEARING
Filed Oct. 18, 1949 3 Sheets-Sheet 1

INVENTORS
VERNON A. TAUSCHER
JOHN M. SLATER
JAMES EMMI
BY William R. Lane
ATTORNEY INVENTORS
VERNON A. TAUSCHER
JOHN M. SLATER
JAMES EMMI
BY William R. Lane
ATTORNEY

INVENTORS
VERNON A. TAUSCHER
JOHN M. SLATER
JAMES EMMI

BY William R. Lane
ATTORNEY

UNITED STATES PATENT OFFICE 2,644,727

DOUBLE-BALL GYRO PRECESSION AXIS BEARING

Vernon A. Tauscher, Los Angeles, John M. Slater, Inglewood, and James Emmi, Los Angeles, Calif., assignors to North American Aviation, Inc.

Application October 18, 1949, Serial No. 121,964

11 Claims. (Cl. 308—9)

This invention pertains to supporting a mass with a single degree of angular freedom, and particularly to supporting a gyroscope about its precession axis without friction.

In the past, it has been customary to support gyroscopes in direction sensitive equipment on ball or roller bearings. Where extreme precision is required, air bearings have been proposed, such as shown in U. S. Patent No. 2,200,976, issued May 14, 1940, to Mortimer F. Bates. Supporting a gyroscope on mechanical bearings of the ball or roller type is undesirable, when more than a moderate degree of precision is required, because of the attendant friction. This varies, both with angular rotation and with changes in acceleration applied to the gyroscope, and is always relatively large. On the other hand, air bearings hitherto proposed for the purpose of supporting a gyroscope about its precessional axis have suffered from the disadvantage of requiring an almost impracticable degree of precision in order to attain the rigidity and accurate alignment required in supporting a gyroscope. Moreover, air bearings hitherto proposed have been undesirably large and cumbersome as compared with mechanical bearings, due to the prevailing theory that large area and low pressure are best for air bearings. Mechanical bearings are cheap and compact, but imprecise, and conventional air bearings are precise but expensive and bulky.

It is an object of this invention to provide a low friction supporting device for a gyroscope which is relatively easy and cheap to manufacture.

It is a further object of this invention to provide a single degree of freedom air bearing adapted to operate at relatively high air pressure.

It is a further object of this invention to provide a precision air bearing with a plurality of self-aligning bearing surfaces.

It is a further object of this invention to provide means for supporting a gyroscope or other device which requires a frictionless single degree of freedom support.

It is another object of this invention to provide a small compact high pressure air bearing.

It is a further object of this invention to provide means for supporting any mass with a single degree of freedom and no friction.

It is a further object of this invention to provide a frictionless precession axis support for a gyroscope.

It is a further object of this invention to provide a gas bearing for supporting a gyroscope or other mass, which bearing is compact and small in comparison to hitherto known gas bearings.

Other objects of invention will become apparent from the following description taken in connection with the accompanying drawings, in which.

Figure 1:
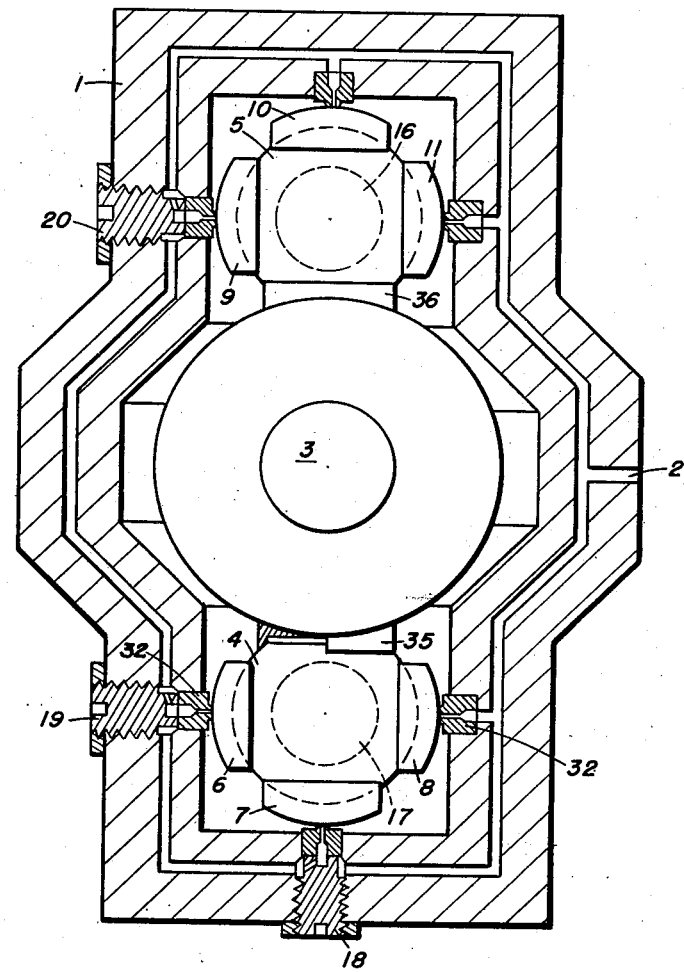
Fig. 1 is a sectional view of one embodiment of the invention.
Figure 3:
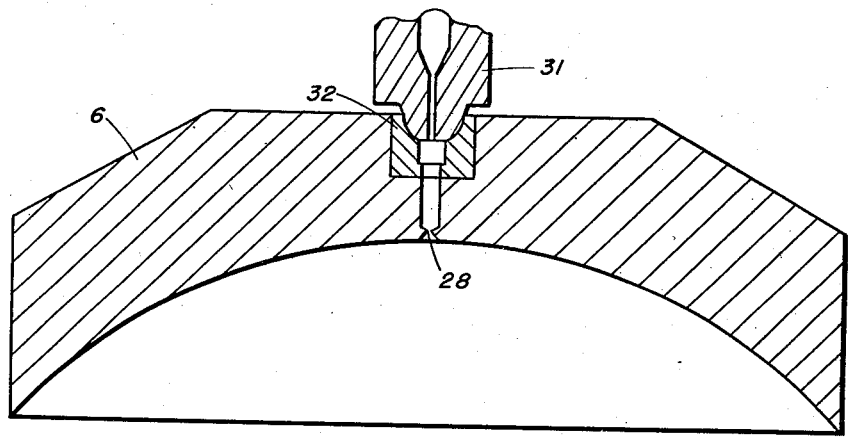
Fig. 3 is a sectional view of an air pad of one embodiment of the invention.

Referring now to Fig. 1, there is shown a rigid frame 1 adapted to receive air under pressure through conduit 2. A gyroscope or other mass 3 is adjustably held by clamp members 35 and 36 to two partial shperes 4 and 5 which are in turn supported on pads 6, 7, 8, 9, 10 and 11, each of which is pivoted on pivot members rigidly attached to frame 1. Fig. 3 shows a restriction 28 in a pad 6 which forces air to flow in a thin film around the typical male pivot 31 and female pivot 32 of the device shown in Fig. 1. Additional pads 16 and 17 behind the ball members are provided for support normal to the plane of the section and two other pads similar in configuration are provided over spheres 4 and 5 but are not shown for the sake of simplicity, it being understood that the sectional view of Fig. 1 is taken at a plane of symmetry of the frame and pads. Each pivot member is adapted to receive air under pressure from conduit 2, and the pads 6 through 11, and 16 and 17 have angular freedom with respect to their respective pivots. The pads are machined with a spherical inside contour corresponding to the external surface of partial spheres 4 and 5. The mating surfaces of the pads and partial spheres 4 and 5 are carefully ground and lapped so that the gap existent between the pads and the partial spheres during operation of the device is of the order of .0003 of an inch. Air is introduced under pressure to conduit 2 through the pivots of the pads and is allowed to flow through small restrictions 28 in the center of each pad as more particularly shown in Fig. 3. The precessional axis of the gyroscope shown in Fig. 1 passes through a line joining the centers of partial spheres 4 and 5, and it is about this axis that it is desired to eliminate all friction in order that no extraneous torques will be applied to the gyroscope.

It is to be understood throughout this discussion that the support scheme contemplated in this invention may be employed to support devices other than gyroscopes, but a gyroscope is chosen for illustrative purposes because the gyroscope represents one of the most difficult or critical support conditions encountered in practice, since a small unknown torque applied about the precessional axis of the gyroscope will cause an error that increases with time. Likewise, it is to be understood that any gas or vapor may be substituted for air whenever it is herein referred to.

Referring again to Fig. 1, pads 6 through 11, and 16 and 17 are restrained by the combined action of their respective pivots and the reaction of partial spheres 4 and 5. Screw inserts 18, 19 and 20 are provided to give axial adjustment of the corresponding pads. Identical inserts (not shown) are provided along two axes perpendicular to the sheet of Fig. 1 and through the center of pads 16 and 17, respectively. The introduction of air under pressure into the center of the pads provides a thin film of air at all times between the pads and the partial spheres. This film of air provides the frictionless support which it is desired to impart to the gyroscope. Since the pads are pivotally supported they are free to accommodate themselves to the gyroscope and partial spheres; consequently, they need only be lapped to the proper spherical contour and need not be particularly oriented with respect to frame 1. Alignment of the pads on one end of the frame with those on the other end is therefore eliminated along with its attendant costly machine work. It is evident that pads 6 through 11, and 16 and 17 of the embodiment shown in Fig. 1 each have three degrees of angular freedom about pivot 31 as shown in Fig. 3. The first degree of angular freedom is provided about the axis of pivot 31. The other degrees of angular freedom are provided about any pair of orthogonal axes which are perpendicular to the axis of pivot 31 and pass through the rotation point of pivot 31. Pads 6 through 11, and 16 and 17 may be made on identical automatic machinery and can be interchangeable. If the pads and spheres are as nearly perfect as automatic lapping will allow, no appreciable frictional torque will be experienced by the gyroscope about its precessional axis. The only torque which may be apparent is that introduced by reason of friction between the pads and their respective pivots, which prevents the pad from adjusting itself exactly to the contour of the ball and thus lets more air spill out one side than the other. However, with accurately machined pads, partial spheres and pivots, the tilt or "cocking" of each pad in its pivot should be extremely small, thereby placing a small maximum value on the frictional torque developed on the gyroscope.

Figure 2:
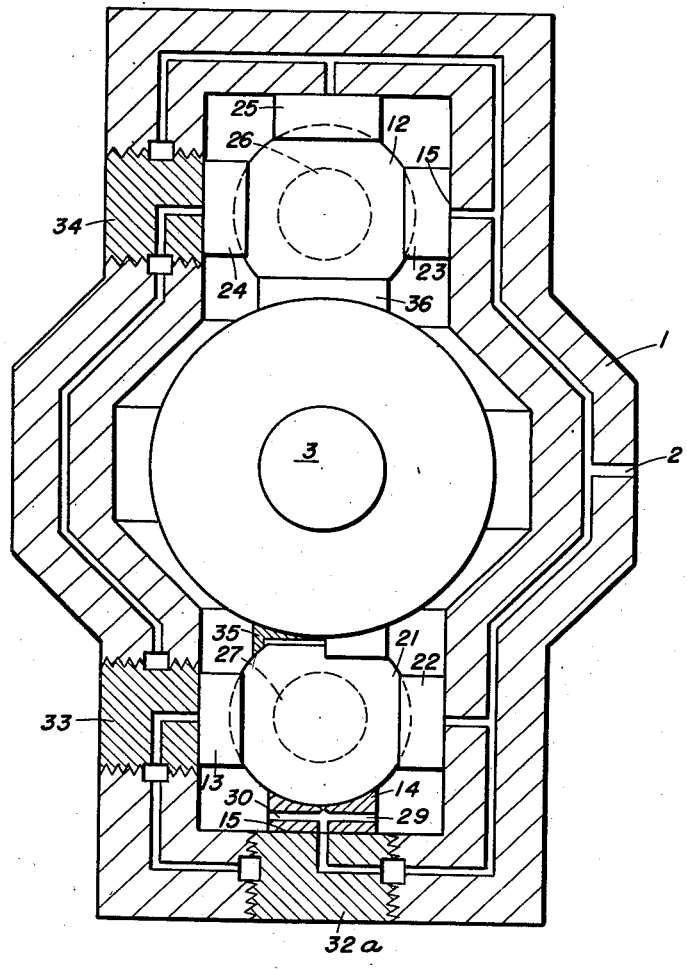
Fig. 2 is a sectional view of a second embodiment of the invention.
Figure 4:
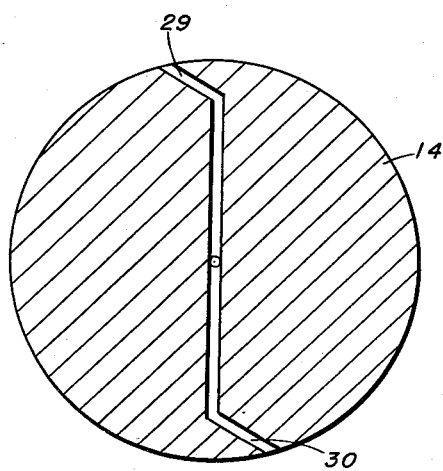
Fig. 4 is a sectional view of an air pad of a second embodiment of the invention.

Referring now to Fig. 2, there is shown a second embodiment of the device shown in Fig. 1 which eliminates the extremely small torque developed in the device shown in Fig. 1 due to pivot friction. In Fig. 2, spheres 12 and 21 are supported by floating pads 13, 14, 22, 23, 24, 25, 26 and 27 which are air-supported between partial spheres 12 and 21 and flat frame surface 15. Frame surface 15 may also be concave or convex if desired. As an example, air enters from conduit 2 in the frame member and is partially dissipated along the surface between pad 14 and surface 15. To effect the floating action necessary to eliminate the torque present in the device shown in Fig. 2, a small restriction is placed in the path of the air as it goes through pad 14. This restriction is the same as that shown in Fig. 3 at 28. The surface of pad 14 in contact with partial sphere 21 is the same as in the pads of Fig. 1. Screw inserts 32a, 33, and 34, similar to those shown in Fig. 1, are provided for a similar purpose. Identical screw inserts (not shown) may be provided along two axes perpendicular to the sheet of Fig. 2 and through the center of pads 26 and 27, respectively. The pad is capable of adjusting itself perfectly to the contour of the ball. This is apparent if one imagines the pad to be displaced sidewise slightly and then let go. It translates freely over the flat surface of the frame under the influence of unsymmetrical air flow, until it reaches its position of equilibrium, exactly parallel to the ball surface. To eliminate any error due to imperfections of the pad, a pair of small holes 29 and 30 may be drilled in the pad as shown in Fig. 4, at an angle with the pad which leaves a predetermined moment arm for discharged air to produce a torque on the pad and to thereby impart to the pad a slow, constant velocity spin. Any imperfections of the pad will therefore be averaged out over one revolution of the pad, and torque applied to the gyroscope by the supporting means is virtually eliminated. This is especially true if the axes of the spun pads are kept at 90 degrees the precessional axis of the gyroscope. If this angular relationship is not maintained, the pad speed may change due to variations in loading attendant upon changes in acceleration to which the gyroscope is subjected, and thereby apply a slight torque. It may be seen that pads 13, 14, 22, 23, 24, 25, 26 and 27 of the embodiment shown in Fig. 2 each have two degrees of freedom in translation and one degree of angular freedom. The degree of angular freedom is provided about the axis of symmetry of each pad. The two degrees of freedom in translation are provided along an arbitrary pair of orthogonal axes perpendicular to the axis of symmetry of the pad. Thus it may be seen that each embodiment of this invention utilizes air pads each of which have three degrees of freedom out of a theoretical total of six degrees of freedom, three in rotation and three in translation.

The balls and pads of the device may be made of glass or quartz by lens-grinding techniques to provide increased rigidity in the bearing. The operating pressure of the air in this bearing is much higher than in any previously known air bearing work, being of the order of 80 p. s. i. This makes for drastic reduction in the size of the bearing for a given load. Therefore, these ball and pad bearings are comparable in size to ball bearings.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for supporting a mass with a single degree of angular freedom comprising a pair of truncated spheres rigidly attached to opposite sides of said mass, a rigid frame surrounding said mass and said spheres, a plurality of pads having inner surfaces corresponding to the surfaces of said spheres supported by said frame for three degrees of freedom and spaced therefrom, and conduit means through said frame and said pads for furnishing air under pressure to the spaces between said pads and said spheres to form an air film between said pads and said spheres to thereby support said mass rigidly without appreciable friction and with a single degree of angular freedom.

2. A device as recited in claim 1 in which said pads are circular in shape and in which said pads are supported on said frame so that their axes of symmetry intersect the line about which said mass is required to have angular freedom.

3. A device as recited in claim 1 and further comprising pivot supports on said frame and pivot sockets on said pads whereby said pads tend to be self-aligning with respect to said spheres.

4. A device as recited in claim 1 in which said frame has flat machined planes on its inner surface normals to which intersect the axis of angular freedom of said mass and in which said pads are flat on one side to conform to said flat machined surfaces, concave spherical shaped on the other side to conform to the surfaces of said spheres, and adapted to be spun at constant angular velocity by air under pressure whereby small torques due to imperfections in said pads are virtually eliminated.

5. Means for supporting a mass with a single degree of angular freedom and substantially without friction comprising a rigid frame having internal conduits, a pair of solids having convex surfaces approaching partial spheres attached to opposite sides of said mass on a line defining the required axis of angular freedom of said mass, a plurality of male pivots rigidly attached to said frame and adapted to receive air under pressure from conduits in said frame, and a plurality of circular pads having at least one concave surface corresponding to said spheres and adapted to receive air under pressure from said male pivots and distribute it to the area between said pads and said spheres, whereby said mass is entirely supported on an air film provided by said pads when air is furnished under pressure to the conduits in said frame.

6. A device as recited in claim 5 in which said pivots have an infinite radius of curvature whereby said pads accommodate themselves to the surface of said spheres by virtue of a single degree of angular freedom and two degrees of translational freedom with respect to said frame.

7. Means for supporting a mass with a single degree of angular freedom and substantially without friction comprising a rigid frame having internal conduits, a pair of truncated solid spheres adapted to fit inside said frame, adaptor clamps for fitting said spheres to said mass while allowing limited angular freedom between said spheres and said mass, a plurality of concave air bearing pads attached to said frame, conduits passing through said bearing pads adapted to receive air under pressure from said internal conduits within said frame, said pads being in close proximity to said spheres, being symmetrically disposed about said spheres and having three degrees of freedom with respect to said frame to allow said pads to accommodate themselves to said spheres, and means for furnishing air under pressure to said conduits to thereby support said spheres and said mass on a film of air between said spheres and said pads substantially without friction.

8. A device as recited in claim 7 in which said frame and said pads are substantially flat where they are contiguous to thereby give said pads two degrees of translational freedom and a single degree of angular freedom with respect to said frame.

9. A device as recited in claim 7 in which said frame and said pads are convex and concave respectively where they are contiguous to thereby give said pads three degrees of angular freedom with respect to said frame.

10. A device as recited in claim 7 in which said pads have an even number of peripheral jets adapted to furnish a uniform spinning reaction torque to said pads to thereby average out error torques due to pad surface imperfections.

11. Means for supporting a mass comprising a pair of balls rigidly attached to opposite sides of said mass, a rigid frame surrounding said mass and said balls, a plurality of pads having inner surfaces corresponding to the surfaces of said balls supported by said frame for three degrees of freedom and spaced therefrom, and conduit means through said frame and said pads for furnishing air under pressure to the spaces between said pads and said balls to form an air film between said pads and said balls to thereby support said mass rigidly without appreciable friction.

VERNON A. TAUSCHER.
JOHN M. SLATER.
JAMES EMMI.

References Cited in the file of this patent

UNITED STATES PATENTS

| Number | Name | Date |
|---|---|---|
| 1,920,725 | Wallgren | Aug. 1, 1933 |
| 2,086,896 | Carter | July 13, 1937 |
| 2,137,487 | Hall | Nov. 22, 1938 |
| 2,200,976 | Bates | May 14, 1940 |